United States Patent [19]
Barker et al.

[11] 3,912,593
[45] Oct. 14, 1975

[54] WATER-INSOLUBLE NITROGEN-CONTAINING BIOLOGICALLY ACTIVE ORGANIC SUBSTANCES

[75] Inventors: Sydney Alan Barker; Ian Malcome Kay; John Frederick Kennedy, all of Birmingham, England

[73] Assignee: Gist-Brocades N.V., Delft, Netherlands

[22] Filed: Sept. 4, 1973

[21] Appl. No.: 394,077

[30] Foreign Application Priority Data
Sept. 6, 1972 United Kingdom............... 41436/72

[52] U.S. Cl.................... 195/57; 195/31 R; 195/59; 195/63; 195/68; 260/112 R; 426/60; 426/61
[51] Int. Cl.²...................... C07G 7/02; C12K 1/00
[58] Field of Search .......... 195/63, 68, DIG. 11, 57, 195/59; 252/461, 464, 465, 466; 260/112; 424/85, 94; 426/60, 61

[56] References Cited
UNITED STATES PATENTS

| | | | |
|---|---|---|---|
| 2,717,852 | 9/1955 | Stone | 195/68 X |
| 3,437,580 | 4/1969 | Arrance et al. | 252/461 X |
| 3,794,563 | 2/1974 | Barker et al. | 195/63 |

OTHER PUBLICATIONS

Barker, et al., Enzyme Reactors for Industry, Process Biochemistry, Oct. 1971, pp. (11–12).
Nelson, et al., Adsorption of Invertase, Journal of American Society, Vol. 38, 1916, (pp. 1109–1115).

Primary Examiner—David M. Naff
Attorney, Agent, or Firm—Hammond & Littell

[57] ABSTRACT

Nitrogen-containing biologically active organic substances are rendered insoluble by chelating to a hydrous oxide or hydrous hydroxide of a metal selected from the group consisting of zirconium, titanium, iron, tin and vanadium.

26 Claims, No Drawings

WATER-INSOLUBLE NITROGEN-CONTAINING BIOLOGICALLY ACTIVE ORGANIC SUBSTANCES

This invention relates to the reversible immobilisation of proteins (including enzymes), peptides (including hormones, hormone releasing factors and cyclic peptides), antibodies, antibiotics, and substances which contain protein, peptide and cyclic peptide moieties such as glycoproteins and lipoproteins, and even whole cells.

During the past decade considerable research and experimentation has been carried out to find means for the water-insolubilisation of proteins, more particularly enzymes, which enable the properties of the proteins, e.g. enzymatic activity, to be utilised conveniently in, for example, analytical chemistry and biochemistry. Many of the preparative methods previously described for water-insoluble forms of proteins are exceedingly complex and may involve numerous reaction steps in the preparation of the solid carrier or support and are consequently inconvenient or costly in industrial practice. Furthermore, the support for the protein (e.g. enzyme) was not in general reusable or regeneratable once the catalytic activity of the protein was exhausted. Means for the water-insolubilisation of enzymes have included adsorption at a solid support surface such as a synthetic polymer, e.g. nylon, or cellulose, or inclusion of the enzyme by entrapment within the matrix of a gel or other polymer.

A simple and inexpensive means has now been found for the reversible immobilisation of proteins, peptides, antibodies, antibiotics and whole cells and substances which contain protein, peptide and cyclic peptide moieties (hereinafter sometimes termed, for convenience, "nitrogen-containing organic substances") which involves the formation of water-insoluble metal chelates. Furthermore, this new means can be used for the recovery of the nitrogen-containing organic substance as well as its reversible immobilisation.

The present invention is concerned with water-insoluble chelates of nitrogen-containing organic substances such as proteins including enzymes, peptides, antibodies, antibiotica and whole cells and substances which contain protein, peptide and cyclic peptide moieties, with a hydrous oxide or a hydrous hydroxide of a metal, for example of tin, iron, vanadium, titanium or, preferably, zirconium, which metal chelates of the nitrogen-containing organic substances exhibit some aspect of the biological properties (e.g. catalytic, antibody or antibiotic properties) characteristic of the nitrogen-containing organic substances originally, and which in some cases is recoverable when the immobilisation is reversed. Preferred chelates of the nitrogen-containing organic substances are those formed with the hydrous oxide of zirconium and to a lesser extent the hydrous oxides or hydroxides of tin (SN,II), iron (Fe,III), vanadium (V,III) and titanium (Ti,IV,III).

The chelates of the nitrogen-containing organic substances (as hereinbefore indicated) of the present invention possess the biological properties initially present in the organic substances and can therefore be used for the same purposes, and once the biological activity of the chelate complex has been used to a desired extent in a process involving, for example, a catalytic, antibiotic or antibody purpose, the nitrogen-containing organic substance can easily be separated from the chelate complex by treatment of a suspension of the chelate in an aqueous medium at an alkaline pH with an aqueous bicarbonate or carbonate solution (e.g. aqueous sodium or potassium bicarbonate), or an aqueous solution of other compounds containing ions capable of displacing the metal chelating component, such as phosphates, molybdates, fluorides. When the chelate complex is treated with an aqueous bicarbonate or carbonate solution, the chelating capacity of the hydrous metal oxide or hydroxide is deactivated. However, the chelating capacity of the hydrous metal oxide or hydroxide can then be readily regenerated by treatment with an acid.

Alternatively, the metal chelate of the nitrogen-containing organic substance, after use, can in an aqueous medium be treated to separate the organic substance from the metal-chelating component with an inorganic (e.g. hydrochloric or sulphuric) acid or an organic acid of such low concentration and acidity that it does not dissolve the hydrous metal oxide or hydroxide and thus regenerate the hydrous metal oxide or hydroxide in a form capable of chelating once again with a nitrogen-containing organic substance.

The choice between the two methods of treatment of the used chelate is often determined by whether the object is to renew the metal nitrogen-containing organic chelate complex with retention of biological activity or to renew an exhausted catalytic surface, e.g. formerly comprised of an immobilized enzyme.

It will be apparent that the present invention provides a means for immobilisation of nitrogen-containing organic substances (i.e. by the formation of metal chelates) wherein the means for the immobilisation, i.e. hydrous metal oxides or hydroxides, are simple inorganic compounds which can be regained, if so desired, after the activity of the organic substance has been utilised, or the chelating capacity of the hydrous metal oxide or hydroxide can be regenerated either in the medium in which the activity of the chelate is utilised or after separation therefrom.

According to a feature of the present invention water-insoluble chelates of nitrogen-containing organic substances (as hereinbefore indicated) are prepared by the process which comprises mixing at least one nitrogen-containing substance with a hydrous oxide or a hydrous hydroxide of a metal, preferably hydrous zirconium oxide, capable of chelating with the nitrogen-containing organic substance or two or more of such hydrous oxides or hydroxides, in an aqueous medium to form a solid metal chelate of the nitrogen-containing organic substance, and optionally separating from the aqueous medium the solid chelate. Zirconium oxides and other metal oxides and hydroxides which have been made by a method which causes the oxide or hydroxide to lose the ability to chelate with the nitrogen-containing organic substances cannot, of course, be used in the aforesaid process.

In a preferred aspect of the process, to an aqueous solution of a zirconium salt (e.g. chloride or sulphate), or other metal salt capable of forming a hydrous oxide or hydroxide able to chelate with a nitrogen-containing organic substance, or an aqueous solution of a mixture of such salts there is added a hydroxide, preferably ammonium or sodium hydroxide, until a pH of from 3 to 8.5 (preferably 6 to 8) is attained and the hydrous oxide or hydroxide of the metal is formed. The suspension of the precipitated hydrous oxide(s) or hydroxide(s) is then mixed with the nitrogen-containing organic substance in an aqueous medium (preferably the organic substance is in aqueous solution) to yield a solid metal chelate of the nitrogen-containing organic substance. Alternatively, the chelate can be formed by coprecipitating in situ the hydrous metal oxide or hydroxide in an aqueous medium containing the nitrogen-containing organic substance and an appropriate metal salt by addition to the aqueous medium of a hydroxide (preferably ammonium hydroxide). The former procedure is preferred as it avoids contacting the nitrogen-containing organic substance with a solution of a metal salt which may have, according to the salt employed, an extremely acid pH range at the commencement of the coprecipitation procedure, and cause a loss of biological activity in the organic substance.

The process of the invention is usefully carried out at ambient temperature with the pH of the reaction medium in which the chelate is formed at 4 to 8, and advantageously at pH 6 to 8. Mixing of the hydrous metal oxide or hydroxide with the nitrogen-containing organic compound in the aqueous medium can be continued for some hours but generally 0.5 to 3 hours is sufficient for maximum retention of biological activity of the organic compound. The higher the initial concentration of the nitrogen-containing organic compound in relation to the hydrous metal oxide or hydroxide in the mixture the better the biological activity of the resultant chelate.

For maximal biological activity of the chelate, mixing of the nitrogen-containing organic substance and the hydrous metal oxide or hydroxide should be done in the absence of carbon dioxide, carbonates, bicarbonates and certain other ions (e.g. citrate) which can affect chelation of the nitrogen-containing organic substance as they modify the nature of the hydrous metal oxide or hydroxide and prevent effective chelation.

The invention is particularly concerned with metal chelates of enzymes such as glucose oxidase, glucose isomerase, lactase, catalase, invertase, $\alpha$- and $\beta$-amylase, pullulanase, penicillin acylase, bacterial protease trypsin, chymotrypsin, glucoamylase, dextranase, glucosidase and Maxatase (Trade Mark); lectins such as concanavalin; hormone releasing factors such as follicle stimulating hormone releasing factor, luteinizing hormone releasing factor, adrenocorticotropic hormone; hormones (proteins) such as follicle stimulating hormone and luteinizing hormone; antibodies in anti-pneumococcus sera and various $\gamma$-globulins; and antibiotics such as penicillin, gramidicin D, lathumycin derived from the microorganism S. lathumensis, neomycin, polymyxin, streptomycin, ampicillin and chloroamphenicol; co-enzymes such as nicotinamide adenine dinucleotide and reduced nicotinamide adenine dinucleotide; whole cells such as baker's yeast and Escherichia coli.

It is also possible to chelate two or more of the above-mentioned substances to the hydrous metal oxide or hydroxide, e.g. an amino acid and an enzyme, which makes it possible, for example, to modify the enzymatic activity of the final product.

The present invention makes it possible to separate from aqueous media containing an antibiotic, e.g. lathumycin, after elimination of substances which can compete with, or modify, the chelating properties of the hydrous metal oxides or hydroxides, such as carbon dioxide or metal carbonates, by addition to the antibiotic-containing media, or the formation therein, of hydrous zirconium oxide or other metal oxide or hydroxide with the resultant precipitation of a metal chelate of the antibiotic, separation of the antibiotic chelate complex, and regeneration of the antibiotic itself by treatment of the separated chelate as hereinbefore described with an aqueous bicarbonate or carbonate solution or with an acid at low concentration and acidity. Such a procedure can also be employed for the separation of other nitrogen-containing organic substances from aqueous media in which they are present.

The invention can also be usefully put, for example, to the formation of antiseptic surfaces with an antibiotic-chelate complex on a dry support, the formation of antibody-chelate complexes for radio-immumo assay, insolubilized concanavalin, and numerous other purposes for which insolubilized enzymes are presently employed with the advantage that they can be utilised in a continuous, as opposed to a batch, process.

The products according to the invention may advantageously be used in, for example, enzyme reactors for technical or analytical purposes, or for affinity chromatography and several other purposes.

Particular merits of the enzyme-chelate complexes of the present invention are (a) the water-insoluble immobilized enzymes retain to a high degree the specific activity of the free enzyme, (b) the enzyme-chelate complexes usually possess greater heat stability than the water-soluble enzyme giving a longer shelf-life and an extended temperature range of operation, and (c) the support matrix for the enzyme may be regenerated when the activity of the enzyme is exhausted or decreased to such an extent that it is unsatisfactory.

The following Examples illustrate the invention.

EXAMPLE 1

Optimum pH for chelation of glucose oxidase with hydrous zirconium oxide

To a 2.0 ml. aliquots of zirconium tetrachloride solution (1.53 g./ml.) was added slowly, with stirring, ammonium hydroxide (2.0OM) to precipitate hydrous zirconium oxide and give a range of pH between 4.5 and 8.5. To each of these samples was added 500 $\mu$l of glucose oxidase solution (0.0206 g. of glucose oxidase — activity 144 units/mg., in 10 ml. pH 7.0 phosphate buffer). The samples were stirred at 4°C. for 18 hours, then centrifuged and washed with distilled water (6 × 5 ml.) 1 ml. of distilled water was added to each sample and stirred well to give a suspension. 0.5 ml. of this suspension was taken and dried to constant weight at 120°C. A further 1.0 ml. of the suspension was removed and diluted 100 times with distilled water. The enzyme activity of this diluted sample was assayed as hereinafter indicated. 2.5 ml. ABTS-2,2'-azino-di[3-ethyl-benzothiazoline-(6)-sulphonic acid], a complex dye (0.5 mg./ml. ABTS in 0.1M phosphate buffer, pH 7.0), 10 $\mu$l of peroxidase (2 mg./ml. in 0.1M phosphate buffer pH 7.0) and 500 $\mu$l of a 10% glucose solution were mixed and the optical density (O.D.) at 415 nm. monitored for several minutes. 20 $\mu$l of the oxide suspension were added and the increase in O.D. at 26°C. monitored continuously using a Beckman DB-G spectrophotometer linked to a chart recorder.

$$\text{Activity} = \frac{\Delta E/\min \times 3.03}{38 \times \text{wt. of oxide in assay}} \text{ units/dry gram } ZrO_2$$

when ΔE is the change or optical density.

| pH of chelation | ΔE 415/min | Wt. of 0.5 ml. sample | Activity units/g. |
| --- | --- | --- | --- |
| 4.45 | 0.00599 | 0.0201 | 60 |
| 5.02 | 0.0199 | 0.0226 | 176 |
| 5.54 | 0.0244 | 0.0226 | 215 |
| 5.92 | 0.0320 | 0.0236 | 271 |
| 6.47 | 0.0353 | 0.0258 | 273 |
| 7.49 | 0.0318 | 0.0254 | 250 |

EXAMPLE 2

Optimum stirring time for chelation of glucose oxidase with hydrous zirconium oxide To samples of zirconium oxide precipitated to pH 6.0 (as in Example 1) were added 500 μl aliquots of glucose oxidase solution (as in Example I). The mixtures were stirred for varying times at 4°C., centrifuged, then washed and assayed for enzyme activity as in Example 1.

| Stirring time (hours) | ΔE/min | Wt. of 0.5 ml. sample | Activity units/g. |
| --- | --- | --- | --- |
| 0.5 | 0.0367 | 0.0236 | 310 |
| 1 | 0.0399 | 0.0226 | 353 |
| 2 | 0.0367 | 0.0218 | 336 |
| 3 | 0.0407 | 0.0232 | 351 |
| 5 | 0.0328 | 0.0206 | 318 |
| 18 | 0.0320 | 0.0236 | 271 |

EXAMPLE 3

Optimum Enzyme/Zirconium Oxide Ratio

To samples of zirconium oxide precipitated to pH 6.0 (as in Example 1) were added varying amounts of glucose oxidase solution. After stirring for 2 hours at 4°C., the samples were centrifuged, then washed and assayed as in Example 1.

| Amount of glucose oxidase (mg.) | ΔE/min | Wt. of 0.5 ml. sample | Activity units/g. |
| --- | --- | --- | --- |
| 0.05 | 0.00119 | 0.0244 | 10 |
| 0.10 | 0.00252 | 0.0239 | 21 |
| 0.52 | 0.0170 | 0.0242 | 140 |
| 1.04 | 0.0367 | 0.0218 | 336 |
| 2.08 | 0.0971 | 0.0182 | 1070 |
| 4.16 | 0.162 | 0.0142 | 2280 |

EXAMPLE 4

Chelation of glucose oxidase with various metal oxides

Glucose oxidase (3.0 mg.) was chelated with hydrous oxides of zirconium, vanadium (III), iron (III) and tin (II) at pH 6.0 as described in Example I and the activity of the enzyme chelate assayed as described in that Example.

| Metal | Activity units/g |
| --- | --- |
| Zr (IV) | 1340 |
| Sn (II) | 1750 |
| Fe (III) | 4230* |
| V (III) | 9800* |

*It is thought that the metal ions in these cases interfere in the assay to give artificially high results.

EXAMPLE 5

Chelation of Peroxidase with various metal oxides

Peroxidase (1.0 mg.) was chelated with the hydrous oxides of zirconium, tin (II), iron (III) and vanadium (III) at pH 6.0 as previously described for glucose oxidase. After washing, the activity of the enzyme chelate was assayed as follows: The suspension of solid phase peroxidase was diluted a 100 times, and 25 μl added to 2.5 mls of ABTS (0.5 g/l) in 0.1M phosphate buffer, pH 5.0 and 0.5 ml. hydrogen peroxide solution (10mM). The O.D. was monitored at 415 nm and 26°C. Standards were analyzed using 2.5 ml. of ABTS, 25 μl of hydrogen peroxide of various concentrations (0–2.5 mM), and and 0.5 ml. of the original peroxidase solution (diluted × 1000).

| Metal | Activity units*/mg |
| --- | --- |
| Zr (IV) | 81 |
| Sn (II) | 69 |
| Fe (III) | 70 |
| V (III) | 36 |

*1 unit = 1 μM H₂O₂ oxidised per minute at 25°C., pH 5.0.

EXAMPLE 6

Chelation of Dextranase with various metal oxides 3.0 mg. of dextranase (α-1,6-glucan 6-glucanohydrolase) was chelated with the hydrous oxides of zirconium, tin (II) iron (III) and vanadium (III) under the conditions previously described (Example I). After washing with water, the activity of the samples was assayed as follows: 25 μl of dextranase/metal oxide was added to 1.0 ml. dextran (0.5% in 0.2M acetate buffer, pH 5.0) and incubated at 25°C. for 30 minutes. An aliquot of 500 μl was taken and added to 2.5 ml. of assay reagent (see below), heated at 100°C. for 10 minutes, cooled and the O.D. at 570 nm read. The assay reagent contains 0.25 g. of 3,5-dinitrosalicylic acid, 75 g. of sodium potassium tartrate and 50 ml. of 2N sodium hydroxide made up to 250 ml. with distilled water and stored in a dark bottle.

| Metal | Activity units*/g |
| --- | --- |
| Zr (IV) | 17 |
| Sn (II) | 29 |
| Fe (III) | 62 |
| V (III) | — |

*1 unit = activity of 1 μg of free enzyme.

EXAMPLE 7

Elution of dextranase from zirconium oxide

Samples of zirconium oxide (pH 7.0, standard amount) were prepared, to each of them was added dextranase solution (2.5 ml, 1.8 mg/ml) and then these samples were stirred for 2 hours at 4°C. After centrifugation and removal of the supernatants, the solids were stirred with water (1 × 10 ml) at 4°C for 1 hour, centrifuged and the washings removed. Potassium fluoride (1.0 M, 10 ml) or disodium hydrogen phosphate (0.5 M, 10 ml) was then added and the samples stirred for 1 hour at 4°C. After centrifugation, the eluates were removed and assayed for dextranase activity together with the water washings and the original supernatants. Soluble dextranase was assayed in the presence of fluoride to ensure it did not inhibit enzymatic activity.

| Sample | Dextranase activity*) | |
|---|---|---|
| | 1 | 2 |
| Supernatant | 0 | 0 |
| Water | 0 | 0 |
| Phosphate | 24 | |
| Fluoride | | 0 |

*) as a percentage of the free enzyme activity.

EXAMPLE 8

Chelation of β-glucosidase with varius metal oxides

β-Glucosidase (2.15 mg.) was chelated with the hydrous oxides of zirconium, tin (II), iron (III) and vanadium (III) using the method previously described (Example 1). After washing with water (6 × 5.0 ml), the activity of the enzyme chelates was assayed as hereinafter indicated.

20 μl of the enzyme/metal oxide suspension was added to 5.0 ml. of o-nitrophenyl-β-D-glucopyranoside (2.4 mg./ml in 0.005M acetate buffer pH 5.0) which had been pre-warmed to 37°C. The samples were incubated, with stirring, at 37°C. for 30 minutes. After this time, the reaction was stopped by taking 500 μl aliquots and adding them to an equal volume of 0.2M sodium carbonate solution. The O.D. at 420 nm was read and the amount of o-nitrophenol released by the enzyme determined by reference to a calibration curve. The activity of the soluble enzyme was found in a similar manner.

| Metal | Activity units*/g | |
|---|---|---|
| Zr (IV) | 202 | Activity of soluble enzyme |
| Sn (II) | 72 | = 49 units/mg |
| Fe (III) | 289 | |
| V (III) | 76 | |

*1 unit = 1μM o-nitrophenol liberated per minute at 37°C., pH 5.0.

EXAMPLE 9

Chelation of α-chymotrypsin with various hydrous metal oxides

α-Chymotrypsin (1.87 mg.) was chelated with the hydrous oxides of zirconium, tin (II), iron (III) and vanadium (III) as described in Example I. After washing with water (6 × 5.0 ml.), the activity of the enzyme chelate was determined as follows: 200 μl of enzyme/-metal oxide suspension was added to 800 μl of 0.1M borate buffer (pH 8.0) and warmed to 37°C. To this was added 1 ml. casein (Hammarsten) solution (1 g. casein + 1.1 ml. 5% calcium chloride solution in 100 ml. 0.1M borate buffer) and the samples incubated, with stirring, at 37°C. for 20 minutes. After this time 5% w/v aqueous trichloroacetic acid (3.0 ml) was added to terminate the reaction. After centrifugation, the O.D. of the supernatant at 280nm was read and the activity of the samples determined by reference to a standard curve obtained from known soluble enzyme activity.

| Metal | Activity $CU_{cas}$/g* | |
|---|---|---|
| Zr (IV) | 1.40 | Soluble enzyme activity |
| Sn (II) | 1.33 | 276 $CU_{cas}$/mg. |
| Fe (III) | 7.76 | |
| V (III) | 8.82 | |

*1 $CU_{cas}$ is the amount of chymotrypsin which under the defined conditions causes an increase in O.D. at 280 nm of 1.00 in 1 minute.

EXAMPLE 10

Chelation of trypsin with various hydrous metal oxides

Typsin (2.06 mg.) was chelated with the hydrous oxides of zirconium, tin (II), iron (III) and vanadium (III) using the method of Example 1. After washing with water (6 × 5.0 ml.), the samples were assayed for enzymatic activity as follows: Aliquots of the enzyme/metal oxide suspension (20–200 μl) were taken, made up to 1.0 ml. with 0.05M phosphate buffer, pH 7.6, and warmed to 37°C. 1.0 ml. of casein solution (1% w/v is 0.05M phosphate buffer, pH 7.6) pre-warmed to 37°C. was then added to each and incubated at 37°C. for 20 minutes. After this time the reaction was terminated by the addition of trichloroacetic acid (5% w/v in water, 3.0 ml.). The samples were centrifuged and the O.D. at 280 nm of the supernatants read. By reference to a curve constructed from known concentrations of soluble enzyme, the activities of the samples were found.

| Metal | Activity $TU_{cas}$*/g | |
|---|---|---|
| Zr (IV) | 0.87 | Soluble enzyme activity |
| Sn (II) | 2.42 | = 1.19 $TU_{cas}$/mg. |
| Fe (III) | 6.54 | |
| V (III) | 13.1 | |

*1 $TU_{cas}$ is the amount of trypsin which, under the defined conditions, liberates sufficient trichloroacetic acid soluble hydrolysis products that the O.D. at 280 nm increases by 1.00 in 1 minute.

EXAMPLE 11

Chelation of Glucoamylace with various hydrous metal oxides 3.0 mg. of crude, dialysed glucoamylace (α-1,4-glucan glucohydrolase) was chelated with the hydrous oxides of zirconium, tin (II), iron (III) and vanadium (III) using the method previously described (Example 1). After washing with water (6 × 5.0 ml) the activity of the enzyme chelate was assayed as hereinafter indicated.

25 µl of glucoamylase/metal oxide suspension was added to 5.0 ml. of starch solution (1% in 0.2M acetate buffer pH 5.0) and incubated at 37°C. for 30 minutes. A 25µl aliquot was taken and added to 1.0 ml. of a solution containing ABTS (of Example 1) (0.5 g/l), peroxidase (250 µl/l) and glucose oxidase (100 mg/l) and incubated at 26°C. for 30 minutes. The O.D. at 415 nm was then read. The assay was calibrated using glucose standards of varying concentration (0–1 mM).

| Metal | Activity units*/g |
|---|---|
| Zr (IV) | 10.8 |
| Sn (II) | 15.8 |
| Fe (III) | 25.1 |
| V (III) | 15.5 |

*1 unit = 1 µM glucose liberated from starch per minute at 37°C., pH 5.0.

EXAMPLE 12

Chelation of various enzymes with hydrous titanium oxide

Ammonium hydroxide (0.880 × 20 diluted) was added to 500 µl of titanium tetrachloride in water (50% w/v) to pH 7.0 (samples 1 and 2) or to pH 4.5 (sample 3). To samples 2 and 3, 1.5 mls. of glucoamylase (crude, dialysed vs. water, approx. 10 mg./ml. was added, and to sample 1, 1.5 mls. of peroxidase was added. All three samples were then made up to 10 mls. with water, and stirred over night. They were then washed 12 × 10 mls. with 0.1M phosphate buffer, pH 5.0.

Assays of chelated enzyme preparations samples 2 and 3

The Bernfield Assay was used to find the rate of glucose production from starch by the solid phase chelated glucoamylase.

50 µl. of solid phase enzyme suspension were diluted to 1ml. with water, and added to 9 ml. of 1% starch solution in 0.1M phosphate, buffer pH 5.0. The tubes were incubated at 45°C. for 40 minutes and then they were cooled rapidly. 1 ml. aliquots were added to 1 ml. of aqueous 3,5-dinitrosalicyclic acid (1% w/v) and immersed in a boiling water bath for 4 minutes, cooled, and the O.D. at 520 nm was read. Glucose standards (0–1000 µg/ml.) were analyzed in the same way. A dry weight was found by drying 5 mls. of the original suspension, in an oven, after washing with water to remove the buffer. The results were calculated using the following equation:

$$\text{Activity} = \frac{10 \times (\text{wt. of glucose liberated/ml.})}{40} \times \frac{1}{180} \times \frac{1}{(\text{wt. of solid phase enzyme})}$$

The results are shown in the following Table.

SAMPLE 1

The suspension of solid phase peroxidase was diluted 50 times and 25 µl added to 2.5 mls. of ABTS (0.5 g/l) in 0.1M phosphate buffer, pH 5.0 and 0.5 mls. of hydrogen peroxide (2.5 × 10⁻³M). The O.D. at 415 nm was read at various times. Standards were analysed using 2.5 mls. of ABTS, 25 µl. of hydrogen peroxide of various concentrations (0–6 × 10⁻⁴M) and 0.5 mls. of peroxidase (10 µg/ml.). The results are shown in the following Table.

TABLE

| Sample | pH of chelation | Enzyme chelated | Activity (µ/g) | Activity present during chelation (units) | Activity of chelate as a % of original |
|---|---|---|---|---|---|
| 1 | 7.0 | peroxidase | 1.44×10⁵* | 1.51×10⁶ | 8.69 |
| 2 | 7.0 | glucoamylase | 2.04×10³+ | 4.42×10³ | 2.77 |
| 3 | 4.5 | glucoamylase | 2.46×10³+ | 4.42×10³ | 3.34 |

*µM hydrogen peroxide liberated per minute at 37°C., pH 5.0.
+µM glucose liberated per minute at 40°C., pH 5.0.

In another experiment, glucose oxidase, dextranase and glucoamylase were coupled to hydrous titanium oxide under various circumstances.

Titanic chloride (500 µl, approx. 50% w/v in 6 N HCl) was neutralised with NH₄OH (0.880, 20 times diluted) or NaOH (0.1 N) to pH 5.0. Glucose oxidase Boehringer, GOD I, 5 mg in 500 µl water), glucoamylase (ex. Aspergillus niger, approx. 6 mg/ml, dialysed against water) or dextranase (Koch-Light Laboratories Ltd., 3 mg in 500 µl water) was added, the mixture made up to 10 mls with water, and stirred at 4°C for 18 hours. The solid was centrifuged and washed 12 times with water (5 mls) or phosphate buffer (0.1 M, pH 5.0, 5 mls.)

For glucose oxidase, couplings by the same method were conducted at various pH values. The time of stirring and concentration of glucose oxidase were also varied. The results are shown in the following tables.

| Coupling Time hours | pH of Coupling | Glucose oxidase/TiO₂ Enzyme/oxide ratio µg/Mg TiO₂ | Activity Units/g TiO₂ | Specific Activity Units/mg protein | Protein Attached µg/Mg TiO₂ |
|---|---|---|---|---|---|
| ½ | 5.0 | 40 | 750 | 48 | 15.6 |
| 1 | 5.0 | 40 | 950 | 40.5 | 23.4 |
| 2 | 5.0 | 40 | 1,030 | — | — |
| 3 | 5.0 | 40 | 1,060 | 36 | 29.4 |
| 4 | 5.0 | 40 | 1,065 | — | — |
| 5 | 5.0 | 40 | 1,080 | 36 | 30 |
| 18 | 5.0 | 40 | 1,140 | 34 | 35.5 |
| 18 | 5.0 | 10 | 300 | 41.5 | 7.5 |
| 18 | 5.0 | 20 | 770 | 36 | 21.4 |

—Continued

| Coupling Time hours | pH of Coupling | Glucose oxidase/TiO₂ Enzyme/oxide ratio μg/Mg TiO₂ | Activity Units/g TiO₂ | Specific Activity Units/mg protein | Protein Attached μg/Mg TiO₂ |
| --- | --- | --- | --- | --- | --- |
| 18 | 5.0 | 40 | 1,100 | 35 | 31.4 |
| 18 | 5.0 | 80 | 1,680 | 31.5 | 53.4 |
| 18 | 5.0 | 120 | 1,780 | 26.5 | 67.0 |
| 18 | 5.0 | 160 | 2,050 | — | — |
| 18 | 4.75 | 40 | 950 | 33.5 | 28.4 |
| 18 | 5.65 | 40 | 1,100 | 35.5 | 31.0 |
| 18 | 7.05 | 40 | 1,150 | 35.0 | 32.9 |
| 18 | 7.75 | 40 | 1,150 | 37.5 | 30.7 |
| 18 | 8.50 | 40 | 1,050 | 32.5 | 32.3 |

| Enzyme | Specific Activity (Free) | Specific Activity (Coupled) | Retention of Specific Activity | Activity Originally Present | Activity Recovered | Retention of Activity |
| --- | --- | --- | --- | --- | --- | --- |
| | Units/ mg protein | Units/ mg protein | % | Units/ TiO₂ | Units/ TiO₂ | % |
| Glucose Oxidase | 75.4 | 48 | 64 | 3,000 | 750 | 25 |
| Glucose Oxidase | 75.4 | 36 | 48 | 1,500 | 770 | 51 |
| Dextranase | — | — | — | 60 | 20 | 33 |
| Gluco-amylase | — | — | — | 73.5 | 2.5 | 3.3 |

EXAMPLE 13

Adsorption of glucoamylase to zirconium oxide 3.06 g of zirconium tetrachloride were dissolved in 20 ml of hydrochloric acid (1 N). To this solution was added slowly, with stirring, about 30 ml of ammonium hydroxide solution (2 N) to precipitate the oxide at pH 5.0. To the preparation obtained was added 10 ml of glucoamylase solution (1.0092 g of glucoamylase from Gist-Brocades N.V.) in 50 ml of distilled water. The suspension obtained was stirred at 4°C for 18 hours, centrifuged and washed with distilled water (three times). The enzymatic activity was determined with pNPG (p-nitrophenyl-α-D-glucopyranoside). Samples of 10 ml (about 0.5 g ZrO₂) were mixed at 30°C for 15 minutes with 25 ml 0.2% pNPG in acetate buffer of pH 4.7. The reaction was stopped by adding a 5% solution of sodium carbonate. The O.D. was read at 400 nm and the activity of the enzyme sample was calculated therefrom, by means of the following equation:

$$\text{activity} = \frac{\Delta O.D./15 \text{ min, } 30°C \times \text{dilution factor}}{0.1 \times \text{weight of amount sample}} = \text{pNPG units/g}$$

(One unit is the amount of glucoamylace causing an increase in O.D. at 400 nm of 0.1 in 15 minutes at 30°C).

The results are:

soluble enzyme 2720 pNPG units/g
suspension 408 pNPG units/g, based on dry ZrO₂
percentage adsorption 75

EXAMPLE 14

Conversion of starch by glucoamylase bound to hydrous zirconium oxide 18.36 g of zirconium tetrachloride were dissolved in 120 ml of hydrochloric acid (1 N). To this solution was added at once, with stirring, 200 ml of sodium hydroxide (2 N), resulting in a dense, flocculant precipitate of hydrous zirconium oxide. After 18 hours incubation at 4°C with a solution of 3 g of glucoamylase in 150 ml of distilled water, the suspension was centrifuged and washed several time with distilled water. The activity was 510 pNPG units calculated on 1 g of dry ZrO₂. The percentage adsorption was about 84%.

a. Conversion of starch by the immobilized glucoamylase suspension as such.

| time | % conversion | |
| --- | --- | --- |
| first 24 hours | 94 | 100 ml starch solution with 100 g wet suspension |
| second 24 hours[1] | 94 | 50 ml starch solution with 80 g wet suspension. |

[1])After the first conversion, the suspension was centrifuged and washed. New substrate was added.

b. Conversion of starch by the immobilised glucoamylase suspension after lyophilisation (2 g of lyophilized material per 50 ml of substrate).

| time | % conversion |
| --- | --- |
| first 24 hours | 66 |
| second 24 hours | 63 | c. Conversion of starch by immobilised glucoamylase after drying the suspension at 20°C (2.5 g of dry material per 50 ml of substrate).

On subsequent immersion in water the dry material broke down to smaller granular particles.

| time | % conversion |
|---|---|
| 3.5 days | 23 |
| 6 days [2] | 42 |

[2])Between the two runs, neither new substrate was added nor the solids were washed.

Note. The substrate was prepared by adding bacterial α-amylase (Gist-Brocades N.V.; 1 g of 4400 BAU/g per 500 grams of starch) to a 30 % starch solution. The suspension was heated to 90°C in about 1 hour. After a 15 minutes boiling period the suspension was filtered. The percentage of conversion was 18.6.

EXAMPLE 15

Elution of glucoamylase from hydrous zirconium oxide

Samples of hydrous zirconium oxide were prepared. A glucoamylase solution was added and the samples were stirred for 18 hours at 4°C (in the manner described in Example 14). The samples were centrifuged and washed several times and to the residues there were added several buffer or other solutions in a ratio of 1:1, as detailed below. The mixtures were stirred for 1 hour at about 30° to 35°C. After centrifugation the supernatants were removed and the residues were assayed for glucoamylase activity. The activity of the original solution was 482 pNPG per gram, calculated on dry $ZrO_2$.

| Sample | Buffer solution | Activity Residue in pNPG units /g $ZrO_2$ | Remaining activity Residue as % original suspension |
|---|---|---|---|
| 1 | water | 482 | 100 |
| 2 | phosphate buffer 0.1 M, pH 5.0 | 410 | 84.5 |
| 3 | phosphate buffer 0.1 M, pH 6.9 | 418 | 85 |
| 4 | acetate buffer 0.005 M, pH 5.0 | 534 | 100 |
| 5 | Di-Na H phosphate 0.5 M | 244 | 51 |

EXAMPLE 16

Preparation and action of glucoamylase bound to zirconium oxide in a granular form using the ionic properties of the hydrous zirconium oxide 9.18 g of zirconium tetrachloride were dissolved in 60 ml of hydrochloric acid (1 N). To this solution was added 60 ml AMBERLITE IRC-50 (a cationic exchange resin). After stirring for 3 hours at room temperature, 85 ml 2 N sodium hydroxide were added to bring the suspension to pH 7.4. The suspension was filtered, and the residue was washed. The resin was incubated overnight with a glucoamylase solution (2 g of glucoamylase in 80 ml of distilled water) at 4°C. The suspension was filtered and the residue was washed. The residue was incubated at room temperature with a substrate as described in Example 14.

The activity of glucoamylase remaining on the resin was 28.5% of the original activity.

| Incubation time | % conversion |
|---|---|
| First three days | 79 |
| Second three days | 79 |
| Third three days | 69 |

A slight change in pH was observed during the incubation (from 7.4 to 6.5). The immobilised glucoamylase was washed after each run and new substrate was added (50 ml of substrate per 30 ml of immobilised glucoamylase).

EXAMPLE 17

Chelation of the co-enzymes nicotinamide adenine dinucleotide and reduced nicotinamide adenine dinucleotide with various hydrous metal oxides Nicotinamide adenine dinucleotide (2.08 mg.) and reduced nicotinamide, disodium salt (2.08 mg.) were chelated with the hydrous oxides of zirconium, tin (II), iron (III) and vanadium (III) in a volume of liquid of 10.0 ml., using the method of Example 1. The samples were centrifuged and the co-enzyme concentration of the supernatants determined by measurement of their absorbances at 260 nm (pH 7.0).

| Metal | Percentage NAD Chelated | Percentage NADH Chelated |
|---|---|---|
| Zr (IV) | 94.0 | 90.5 |
| Sn (II) | 91.7 | 93.1 |
| Fe (III) | 98.5 | 91.3 |
| V (III) | 98.3 | 89.4 |

EXAMPLE 18

Chelation of Concanavalin A with various metal oxides

Concanavalin A (16.05 mg. solid = 2.02 mg. protein) was chelated with the hydrous oxides of zirconium, tin (II), iron (III) and vanadium (III) as in Example 1, the total volume of liquid being 10.0 ml. After centrifugation of the samples, the protein contents of the supernatants were determined spectrophotometrically at 280 nm.

| Metal | Percentage Protein Chelated |
|---|---|
| Zr (IV) | 93.5 |
| Sn (II) | 98.7 |
| Fe (III) | 98.4 |
| V (III) | 92.5 |

EXAMPLE 19

Preparation of immobilised yeast cells and detection respiration in them

To hydrous zirconium oxide, prepared from zirconium tetrachloride (2.0 ml, 15.3% w/v) by the addition of ammonium hydroxide (2.0 N) to pH 7.0, was added a suspension of yeast cells (200 mg in 1.0 ml of water) and the mixture agitated gently for 5 minutes. It was then allowed to stand for 1 hour. After this time the precipitate has settled to about half its original volume, leaving a supernatant which was clear and apparently cell-free by comparison with a control experiment in which there was no oxide present. The mixture was centrifuged at low speed, the supernatant removed and the immobilised yeast washed with distilled water (3 times 5.0 ml). It was then re-suspended in acetate buffer (5.0 ml, 0.2 M, pH 5.0), warmed to 26°C and added to 15.0 ml acetate buffer at 26°C in a thermostatted vessel containing an oxygen electrode. The response of the electrode was recorded and compared with the results of another experiment, in which an oxygen electrode was prepared and allowed to equilibrate at 25°C in stirred, aerated, acetate buffer (20 ml, 0.2 M, pH 5.0). The pen of the chart recorder was adjusted to give a reading of 100% with this solution. A suspension of bakers' yeast (200 mg in 1 ml buffer) was added and the response of the electrode recorded. The experiment was then repeated using 100 mg of yeast.

| Time for pen to reach 0 % with: | minutes |
| --- | --- |
| 200 mg yeast | 5 |
| 100 mg yeast | 20 |
| immobilised yeast | 29 |
| without yeast | no appreciable uptake of oxygen |

The table shows a measurable uptake of oxygen for immobilised yeast.

EXAMPLE 20

The adsorption of bacterial cells by hydrous zirconium hydroxide

A fresh culture of *Escherichia coli* (approximately 10 mls) was centrifuged for 30 minutes. After this time, the bacterial cells had collected at the bottom of the tube. The supernatant was removed from this and it was re-suspended in 0.9% saline solution (2.0 ml). After centrifugation for a further 30 minutes, the supernatant was again removed and re-suspended in 2.0 ml saline solution. An aliquot (100 μl) of this was taken and made up to 1 ml with saline to act as a blank. The remainder of the suspension was added to a sample of zirconium hydroxide at pH 7.0 (prepared from 2.0 ml zirconium tetrachloride solution as usual). The mixture was made up to 10.0 ml and shaken gently for 2 hours at room temperature. The sample and blank were then centrifuged for 1 minute at low speed and the O.D. of their supernatants determined at 600 nm and compared.

| | O.D. 600 |
| --- | --- |
| Blank | 0.216 |
| Sample | 0.022 |
| Adsorption of cells = 94.6 %. | |

Attempted removal of cells from zirconium hydroxide

The sample of insolubilised cells/zirconium hydroxide from the above experiment was split into three and attempts made to release the cells into solution as described below.

1. 3 ml of suspension taken and made up to 10 ml with 0.9 % saline. Carbon dioxide was passed through this for 1 hour and the supernatant examined for cells.
2. 3 ml of suspension taken, 5 ml. 0.1 M sodium bicarbonate added and saline to 10.0 ml. After stirring for 1 hour the supernatant was examined.
3. 4 ml of suspension taken, 5 ml 0.1 M sodium bicarbonate added and saline to 10.0 ml. Carbon dioxide was passed for 1 hour and then the supernatant examined.

| Sample No. | O.D. 600 nm |
| --- | --- |
| 1 | 0.015 |
| 2 | 0.24 |
| 3 | 0.066 |

N.B. Examination of supernatant by a microscope did not reveal the presence of any cells.

EXAMPLE 21

Immobilisation and detection of respiration in *Escherichia coli* cells

A culture medium (1 liter) containing cells of *Escherichia coli* was obtained, divided into two batches and centrifuged with high speed (3000 rpm.) for 20 minutes. After this time the cells had collected at the bottom of the tubes and the supernatant was decanted off. The cells were washed with normal physiological saline (0.9%, 10 ml), centrifuged once more and the saline removed. The contents of the two tubes were re-suspended in saline (10 ml) each and samples (5 ml) examined for their response towards the oxygen electrode in a similar manner to that described in Example 19, except that the buffer was replaced by 0.9% saline. The two 5 ml samples remaining were added to samples of the usual hydrous zirconium oxide (pH 7.0, standard amount) and agitated gently for 5 minutes. The precipitate was allowed to settle and then the tubes were centrifuged at low speed for 1 minute. The supernatant was removed and the solid re-suspended in saline to give a total volume of 5 ml. This was added to the oxygen electrode apparatus and the response recorded.

| Time for pen to reach 0 % with: | minutes |
| --- | --- |
| free cells | 7 |
| immobilised cells | 25 |

EXAMPLE 22

Determination of the alkaline phosphatase activity of immobilised *E. coli* cells A suspension of *E. coli* cells in 0.9% saline solution (5 ml.) was immobilised in a similar manner to that described in Example 21 After the precipitate had settled, a sample (0.5 ml.) of the supernatant was taken and tested for alkaline phosphatase activity. The remainder of the supernatant was removed and the solid re-suspended in saline to a total volume of 10 ml. An aliquot (0.05 ml.) of this was taken and assayed for alkaline phosphatase activity, buffer being added to make up the volume to 2.0 ml.

The alkaline phosphatase activity was detected as follows: To 1 ml. of Tris buffer (1 M, pH 8.8) in a 10 mm lightpath spectrophotometer cell was added 0.5 ml. of p-nitrophenyl phosphate (0.04 M) and the temperature brought to 37°C. in the thermostatted cell compartment of a Beckmann DB-G spectrophotometer. The bacterial suspension (0.5 ml.), pre-warmed to 37°C, was then added with rapid mixing and the appearance of free p-nitrophenate ion followed directly at 420 mm. One unit of alkaline phosphatase activity corresponds to the liberation of 1 micromole of p-nitrophenol per hour under the assay conditions.

| Sample | Activity |
| --- | --- |
| Free cells (0.5 ml) | 0.144 units |
| Free cells (1.0 ml) | 0.286 units (corrected for volume) |
| Immobilised cells (0.05 ml) | 0.230 units |

EXAMPLE 23

Chelation of a peptide antibiotic with various metal oxides and antibacterial activity of resulting chelates Ammonium hydroxide (2.0N) was added slowly to 2.0 ml. aliquots of solutions of zirconium tetrachloride, titanium tetrachloride, titanium trichloride, vanadium trichloride, ferric chloride and stannous chloride (all 0.65M in distilled water, except titanium tetrachloride which was in 1N hydrochloric acid) with stirring to precipitate the hydrous oxides or hydroxides of the said metals and give two samples of each, one at pH 5.0 and the other at pH 7.0. To each of the 12 samples was added 5.0 ml. of a solution of lathumycin (an antibiotic produced by the microorganism Streptomyces lathumensis and obtained from Gist-Brocades N.V., Delft, Holland) in distilled water (1.02 mg./ml.) and distilled water to give a final volume of 10 ml. After stirring for 2 hours at 20°C., the mixtures were centrifuged and the O.D. at 350 nm. of the supernatants determined. This was compared with the O.D. of a control at the same pH which consisted of 5.0 ml. of lathumycin solution diluted to 10 ml. with distilled water. The amount of antibiotic chelated was calculated. The precipitates were washed with distilled water (3 × 5 ml.) and the amount of antibiotic removed by this washing determined by U.V. measurements. The amount of lathumycin chelated with the oxides was thus known. The samples were then tested for antibacterial activity against various microorganisms.

Antibacterial testing of antibiotic - metal oxide chelates

A suspension of the sample was prepared using equal volumes of sample and double strength nutrient agar. Simple ditch plates were made with the antibiotic metal oxide chelate suspension in the ditch and the plates inoculated with the microorganisms *Escherichia coli*, *Straptococcus faecalis*, *Staphylococcus pyogenes* and *Pseudomonas aeringinosa*. Of these microorganisms lathumycin is only active against *S. faecalis* and *S. pyogenes*.

In the following Table the abbreviations GUA, GUNA, GI X and Dim have the significance indicated below.

GUA Growth up to and across ditch
GUNA Growth up to but not across ditch
GI X Growth inhibited X mm from ditch
Dim Growth diminished across ditch

| Sample | E. coli | S. faecalis | S. pyogenes | Ps. aeringinosa |
| --- | --- | --- | --- | --- |
| 1 | GUA | GUNA | GI 5 | GUA |
| 2 | GUA | GUNA | GI 7 | GUA |
| 3 | GUA | Dim | Dim | GUA |
| 4 | GUA | GUNA | GI 7 | GUA |
| 5 | | | | |
| 6 | GUA | GUA | GUA | GUA |
| 7 | GUA | GI 3 | GI 7 | GUA |
| 8 | GUA | GUNA | GI 5 | GUA |
| 9 | Dim | GI 5 | GI 5 | Dim |
| 10 | GUA | GUNA | GUNA | GUA |
| 11 | | | | |
| 12 | GUA | GI 5 | GI 7 | GUA |

EXAMPLE 24

Optimum pH for the chelation of a peptide antibiotic with the hydrous oxide of Zirconium, Tin, Iron and Vanadium The hydrous oxides of the above four metals were precipitated to give a range of pH between 6.2 and 7.7 in an identical manner to Example 23. To each of the samples was added 1.0 ml. of a solution of lathumycin (1.02 mg./ml.) in distilled water, and distilled water to give a final volume of 10.0 ml. After stirring for 2 hours at 26°C., the mixtures were centrifuged and the amount of lathumycin chelated calculated as in Example 23.

| Sample No. | Metal Ion | pH of chelation | O.D. of supernatant | lathumycin chelated (mg.) | lathumycin remaining after washing (mg) |
| --- | --- | --- | --- | --- | --- |
| 1 | Zr(IV) | 7.11 | 0.22 | 4.8 | 4.0 |
| 2 | Zr(IV) | 5.08 | 0.51 | 4.4 | 2.5 |
| 3 | Ti(IV) | 7.09 | 1.33 | 3.2 | 0.4 |
| 4 | Ti(IV) | 5.09 | 1.43 | 3.0 | 0.7 |
| 5 | Ti(III) | — | — | — | — |
| 6 | Ti(III) | 5.06 | 2.82 | 1.1 | 0.6 |
| 7 | Fe(III) | 7.08 | 0.88 | 3.8 | 2.0 |
| 8 | Fe(III) | 5.11 | 1.76 | 2.1 | 0 |
| 9 | V(III) | 7.07 | 0.49 | 4.4 | 2.4 |
| 10 | V(III) | 4.91 | 1.02 | 3.6 | 2.6 |
| 11 | Sn(II) | — | — | — | — |
| 12 | Sn(II) | 5.03 | 0.17 | 4.8 | 3.9 |
| 13 | Control | 7.10 | 3.50 | — | — |
| 14 | Control | 5.02 | 3.55 | — | — |

| Metal Solution | pH of chelation | Optical Density | Percentage chelation |
| --- | --- | --- | --- |
| Zr (IV) | 6.22 | 0.08 | 88.5 |
| Zr (IV) | 6.88 | 0.07 | 89.9 |
| Zr (IV) | 7.65 | 0.10 | 85.7 |
| Sn (II) | 6.14 | 0.12 | 83.6 |
| Sn (II) | 6.83 | 0.04 | 94.7 |
| Sn (II) | 7.78 | 0.11 | 84.9 |
| Fe (III) | 6.27 | 0.30 | 60.0 |
| Fe (III) | 7.08 | 0.22 | 70.6 |
| Fe (III) | 7.79 | 0.42 | 44.0 |
| V (III) | 6.31 | 0.22 | 68.3 |
| V (III) | 7.25 | 0.09 | 87.0 |
| Control | 7.16 | 0.73 | — |
| Control | 6.78 | 0.69 | — |
| Control | 5.47 | 0.70 | — |

EXAMPLE 25

Chelation of peptide antibiotic with hydrous metal oxides at varying concentrations To samples of the hydrous oxides of zirconium (IV), tin (II) and iron (III) precipitated to pH 7.0 as in Example 23 was added either 1.0 ml. or 5.0 ml. of the lathumycin solution from Example 23 and distilled water to give a final volume of 10.0 ml. After stirring for 2 hours at 26°C. the samples were centrifuged and the percentage chelation of lathumycin calculated.

| Metal Solution | Amount of lathumycin | pH of chelation | Optical Density | Percentage chelation |
| --- | --- | --- | --- | --- |
| Zr (IV) | 5.0 | 6.87 | 0.32 | 91.2 |
| Zr (IV) | 1.0 | 6.88 | 0.07 | 89.9 |
| Sn (II) | 5.0 | 7.26 | 0.34 | 90.7 |
| Sn (II) | 1.0 | 6.83 | 0.04 | 94.7 |
| Fe (III) | 5.0 | 6.89 | 1.00 | 72.6 |
| Fe (III) | 1.0 | 7.08 | 0.22 | 70.6 |
| Control | 1.0 | 7.16 | 0.73 | — |

EXAMPLE 26

Removal of a peptide antibiotic from its chelates with various hydrous metal oxides by means of sodium bicarbonate About 5 mg. of the cyclic peptide antibiotic lathumycin were chelated with hydrous oxides of zirconium tin (II) and iron (III) at pH 7.0, as described in Example 23, the precise amount chelated also being determined as in that Example. The precipitates were then washed with distilled water (1 × 10 ml.) and 0.1M sodium bicarbonate solution (2 × 10 ml.) at 26°C., the amount of antibiotic removed being determined as before.

| | | Zirconium Oxide | Ferric Oxide | Stannous Oxide |
| --- | --- | --- | --- | --- |
| Amount of lathumycin chelated (mg.) | | 4.7 | 3.7 | 4.6 |
| Water Wash | pH | 5.37 | 5.52 | 5.44 |
| | O.D. | 0.28 | 0.74 | 0.50 |
| | amount | 0.4 | 1.0 | 0.7 |
| 1st Bicarbonate Wash | pH | 8.18 | 8.22 | 8.13 |
| | O.D. | 3.00 | 1.76 | 1.40 |
| | amount | 4.2 | 2.4 | 2.0 |
| 2nd Bicarbonate Wash | pH | 8.81 | 8.58 | 8.67 |
| | O.D. | 0.42 | 0.52 | 0.84 |
| | amount | 0.6 | 0.7 | 1.2 |
| Total lathumycin removed (mg.) | | 4.7±0.5 | 3.7±0.4 | 3.9 |

EXAMPLE 27

Regeneration of the chelating capacity of the oxide after treatment of peptide antibiotic -oxide chelate with sodium bicarbonate solution About 5 mg. of the peptide antibiotic lathumycin were chelated on each of two samples of hydrous zirconium oxide as previously described (Example 23) and then removed by washing with sodium bicarbonate as in Example 26.

To one of the samples was added ammonium hydroxide (0.2N) and hydrochloric acid (0.1N) as necessary to give a pH of 7.0. To this were added 5.0 ml. of a lathumycin solution (1.02 mg./ml.) and distilled water to give a final volume of 10.0 ml.

To the other sample was added hydrochloric acid (2.0 ml., 0.5N) and the suspension stirred at 26°C. for 15 minutes. Ammonium hydroxide (2.0N) was then added to re-precipitate any zirconium ions in solution and adjust the pH to 7.0. To this were added 5.0 ml. of lathumycin solution and distilled water to a total volume of 10.0 ml.

Both samples were then stirred at 26°C. for 2 hours and the percentage chelation of the antibiotic calculated as in Example 23.

| | | Untreated Sample | Acid treated Sample |
| --- | --- | --- | --- |
| Lathumycin chelated initially (mg.) | | 4.7 | 4.7 |
| Amount removed by bicarbonate (mg.) | | 4.7±0.5 | 4.7 |
| Second chelation | pH | 7.05 | 7.11 |
| | O.D. | 3.50 | 0.57 |
| | percentage | 0 | 83.5 |
| | amount(mg) | 0 | 4.3 |

The O.D. of a control at pH 6.84 and 0.102 mg./ml. was 0.70.

EXAMPLE 28

Formation of a peptide antibiotic chelate from a phosphate buffered solution of the antibiotic 75 grams of zirconium chloride were dissolved in 250 ml. of distilled water. While the solution was stirred a 2.0N ammonium hydroxide solution was added dropwise till a pH of 7.0 was obtained. Water was added to the suspension to a final volume of 500 ml.

A mixture of 10 ml. of the hydrous zirconium oxide suspension thus obtained and 10 ml. of a lathumycin solution buffered with a 0.05M phosphate buffer, pH 7.0 (200 mg. of lathumycin per liter) was shaken for 18 hours in a water-bath of 26°C. A 10 ml. sample was centrifuged. The lathumycin concentration in the supernatant fluid was determined by measuring a 2.5 ml. sample mixed with 0.3 ml. of 1M phosphate buffer (pH = 8.0) in a spectrophotometer. The precipitate was treated with 0.1M sodium bicarbonate solution (final volume 10 ml.) and shaken during 2 hours at 26°C. The liberated lathumycin in the supernatant was measured after centrifugation as described above.

The control of lathumycin was obtained in the same way starting from a lathumycin solution 1:1 diluted with water.

Spectra were obtained of (1) control solution, (2) supernatant fluid after chelation and (3) supernatant fluid after sodium bicarbonate treatment. It can be calculated from these spectra that 73% of the lathumycin was chelated with the zirconium hydroxide, and from the chelate 92% of the antibiotic can be recovered by bicarbonate treatment.

EXAMPLE 29

Chelation of peptide antibiotic with a sterilized batch of hydrous zirconium oxide suspension A similar experiment as described in Example 28 was performed with the zirconium hydroxide suspension after sterilization at 120°C. for 30 minutes. The spectra showed that 59% of the lathumycin was chelated with the heat-sterilized hydrous zirconium oxide, while 96% can be recovered by bicarbonate treatment.

EXAMPLE 30

Investigation of the effect of carbon dioxide on the adsorption of lathumycin by hydrous zirconium oxide Samples of zirconium hydroxide were prepared by the addition of 2.0 N ammonium hydroxide to zirconium tetrachloride solution (2.0 ml, 15.3% w/v in distilled water) to give a final pH of 7.0. The samples were treated as variously described below and the effect of the treatment on the adsorption of lathumycin determined by measurement of O.D. as usual.

The lathumycin solution used was 0.1005 g in 100 ml of fermentation medium.

1. To the sample was added 5 ml lathumycin solution and the total volume made up to 20 ml with fermentation medium. The mixture was stirred for 1 hour at 26°C and then the O.D. of the supernatant read.
2. To the sample was added 10 ml of fermentation medium and carbon dioxide bubbled through the mixture for 2 hours. Then 5 ml lathumycin solution was added and the mixture treated as in 1 above.
3. To the sample was added 5 ml of lathumycin solution and fermentation medium to make the total volume 20 ml. Carbon dioxide was bubbled through for 2 hours and then the adsorption of lathumycin determined.
4. To 5 ml of lathumycin solution was added 10 ml of fermentation medium and carbon dioxide bubbled through this solution for 2 hours. It was then added to the zirconium hydroxide and treated as in 1.
5. This was treated similarly to 4, except that the oxygen was bubbled through the solution for 2 hours (at a similar rate to the $CO_2$) before the addition to the zirconium hydroxide.
6. This was treated similarly to 5, except that the pH of the solution was adjusted to 3.5 with 1 N hydrochloric acid before the oxygen was bubbled through.
7. This was similar to 6, the pH being adjusted to 4.4.
8. Also similar to 6, pH adjusted to 4.9.
9. Similar to 6, except that the pH was adjusted to pH 7.0 with 1 N sodium hydroxide before passing the oxygen and re-adjusted to pH 7.0 after passing it.
10. This was similar to 6, except that after passing oxygen the pH was adjusted to 7.0.

Results

Control: 5 ml of lathumycin solution + 15 ml fermentation medium had an O.D. of 1.70 at 349 nm.

| Sample No. | O.D. 349 nm | % Adsorption of lathumycin |
|---|---|---|
| 1 | 0.23 | 86.5 |
| 2 | 1.51 | 11.2 |
| 3 | 1.40 | 17.7 |
| 4 | 1.10 | 35.2 |
| 5 | 0.81 | 52.4 |
| 6 | 0.26 | 84.7 |
| 7 | 0.24 | 88.0 |
| 8 | 0.22 | 87.0 |
| 9 | 1.23 | 27.6 |
| 10 | 0.77 | 54.7 |

EXAMPLE 31

The elution of lathumycin from hydrous zirconium oxide by various solutions

Samples of zirconium oxide (pH 7.0, standard amount) were prepared and to them was added a solution of lathumycin (2.0 ml, 0.1 mg/ml) and distilled water to a total volume of 10.0 ml. They were then stirred at 22°C for 2 hours, centrifuged, the supernatants removed and the amount of lathumycin adsorbed calculated. To the residues were added various buffers and other solutions as detailed below to bring the volume back to 10.0 ml. The mixtures were stirred at 22°C for one hour, centrifuged, the O.D.'s measured and the amount of lathumycin removed calculated.

| Sample | Eluant | Amount adsorbed mg | lathumycin concentration of eluate mg/ml | Amount removed*) A | B |
|---|---|---|---|---|---|
| 1. | glycine 1.0 M | 1.78 | 0.107 | 0.86 | 1.07 |
| 2. | Na molybdate 1.0 M | 1.76 | 0.159 | 1.27 | 1.59 |
| 3. | K fluoride 1.0 M | 1.77 | 0.182 | 1.46 | 1.82 |
| 4. | Di-Na H phosphate 0.5 M | 1.76 | 0.182 | 1.46 | 1.82 |
| 5. | Phosphate buffer 0.1 M pH 7.0 | 1.77 | 0.184 | 1.47 | 1.84 |
| 6. | Phosphate buffer 0.1 M pH 7.4 | 1.77 | 0.200 | 1.60 | 2.00 |
| 7. | Phosphate/citrate 0.1 M pH 5.0 | 1.77 | 0.193 | 1.54 | 1.93 |
| 8. | Phosphate buffer 0.05 M pH 7.6 | 1.77 | 0.145 | 1.16 | 1.45 |
| 9. | Tris buffer 1.0 M pH 8.8 | 1.77 | 0.190 | 1.52 | 1.90 |

*)A = eluate concentration × 8
B = eluate concentration × 10

EXAMPLE 32

Adsorption of lathumycin by dried hydrous zirconium oxide

Two samples of zirconium hydroxide (pH 7.0, standard amount) were prepared in the usual manner. One sample was allowed to dry at room temperature in a vacuum desiccator and the other was freeze-dried. After powdering the products, lathumycin solution (2.0 ml, 1.0 mg/ml) and distilled water were added to give a total volume of 10.0 ml. After stirring for 2 hours at 22°C, the samples were centrifuged, the O.D.'s of the supernatants determined and the uptake of the antibiotic calculated.

Lathumycin uptake by vacuum-dried oxide 11%
Lathumycin uptake by freeze-dried oxide 17%

EXAMPLE 33

Preparation and antibacterial testing of some antibiotic-zirconium oxide complexes To samples of zirconium oxide (pH 7.0, standard amount) were added solutions of various antibiotics (all 1.0 mg/ml) and the mixtures stirred for 2 hours at 22°C. They were then centrifuged, the supernatants removed and the solid phase washed with water (3 × 10 ml). The oxide was then re-suspended in water (3.0 ml) and tested for antibacterial activity by the simple ditch plate method. The results are summarised in the following table.

| Sample | Escherichia coli | Streptococcus faecalis | Staphylococcus pyogenes | Pseudomonas aeruginosa |
|---|---|---|---|---|
| neomycin | GUNA | GUNA | GUNA | GUA |
| polymyxin | GI 2 | GUNA | GUNA | GUNA |
| streptomycin | GI 8 | GUNA | GI 7 | GUA |
| ampicillin | GUA | GUNA | GUNA | GUA |
| chloramphenicol | GI 11 | GI 5 | GI 5 | GUA |
| penicillin | GUA | GUNA | Dim | Dim |

Key
GUA = grew up to and across ditch
GUNA = grew up to but not across ditch
GI x = growth inhibited x mm from ditch = growth diminished across ditch

EXAMPLE 34

The insolubilisation of amino acids on hydrous zirconium oxide

Solutions (1.3 molar) of lysine and glutamic acid were prepared and adjusted to pH 7.0 with sodium hydroxide solution (2.0 molar). Varying amounts of these solutions were added to samples of hydrous zirconium oxide (approximate volume 4 ml) prepared from zirconium tetrachloride solution (2.0 ml, 0.65 molar) by the addition of ammonium hydroxide solution (2.0 molar) to pH 7.0 in the usual manner, to give a range of samples with an amino acid:zirconium ratio varying between 6 and 0.2. The total volume was adjusted to 10.0 ml by the addition of distilled water and then the samples were stirred at 22°C for 2 hours. After this time they were centrifuged and the supernatants removed. The amounts of lysine and glutamic acid adsorbed were measured by spectrophotometry on the supernatant at 280 nm. The results are shown in the following table:

| Molar ratio amino-acid:$ZrO_2$ | Amount of glutamic acid adsorbed (%) | Amount of lysine adsorbed (%) |
|---|---|---|
| 6 | 38 | 62.1 |
| 3 | 71 | 64.6 |
| 2 | 78 | 70.1 |
| 1 | 85 | 74.0 |
| 0.5 | >85 | 80.2 |
| 0.2 | >85 | 81.7 |

EXAMPLE 35

The insolubilisation of dextranase on hydrous zirconium oxide and zirconium oxide/lysine Two samples of zirconium oxide were prepared (standard amount, pH 7.0) by the usual method. To one of these was added lysine (1.3 molar, 3.0 ml) and distilled water to 10.0 ml. The mixture was stirred at 22°C for 2 hours, centrifuged and the supernatant removed. To both samples was then added dextranase solution (2.5 ml, 2 mg/ml) and the mixtures stirred at 4°C for 2 hours. After this time the tubes were centrifuged, the supernatant removed and the samples washed with distilled water (5.0 ml, 3 times).

Both of the insoluble samples retained a considerable part of the activity of the soluble enzyme. For the enzyme on zirconium oxide alone the figure was 61% and for zirconium oxide/lysine it was 85 % (at maximum, pH about 5.0).

We claim:

1. Water-insoluble metal chelates of biologically active nitrogen-containing organic substances with a hydrous oxide of a metal selected from the group consisting of zirconium, titanium, iron, tin and vanadium which metal chelates of the biologically active nitrogen-containing organic substances contain the biological activity of said nitrogen-containing organic substances.

2. Water-insoluble chelates according to claim 1, wherein the hydrous oxide is that of $Zr^{IV}$, $Sn^{II}$, $Fe^{III}$, $V^{III}$, $Ti^{IV}$ or $Ti^{III}$.

3. Water-insoluble chelates according to claim 1, wherein the hydrous oxide is that of tetravalent zirconium.

4. A water-insoluble chelate of claim 1 wherein the nitrogen-containing organic substance is an enzyme selected from the group consisting of glucose oxidase, glucose isomerase, lactase, catalase, α- or β-amylase, pullulanase, penicillin acylase, bacterial protease, trypsin, chymotrypsin, glucoamylase, dextranase and glucosidase.

5. A water-soluble chelate of claim 1 wherein the nitrogen-containing organic substance is a lectin.

6. A water-insoluble chelate of claim 1 wherein the nitrogen-containing organic substance is an antibody.

7. A water-insoluble chelate of claim 1 wherein the nitrogen-containing organic substance is a co-enzyme selected from the group consisting of nicotinamide adenine dinucleotide and reduced nicotinamide adenine dinucleotide.

8. A water-insoluble chelate of claim 1 wherein the nitrogen-containing organic substance is an antibiotic selected from the group consisting of penicillin, gramicidin D, lathumycin, neomycin, polymyxin, streptomycin, ampicillin and chloroamphenicol.

9. A water-insoluble chelate of claim 1 wherein the nitrogen-containing organic substance consists of whole cells selected from the group consisting of cells of bakers' yeast and *Escherichia coli*.

10. A process for preparing water-insoluble metal chelates of biologically active nitrogen-containing organic substances of claim 1 comprising mixing at least one biological active nitrogen-containing substances with at least one hydrous oxide of a metal capable of chelating with the nitrogen-containing organic substance selected from the group consisting of zirconium, titanium, tin, iron and vanadium in an aqueous medium to form a solid metal chelate of the biologically active nitrogen-containing organic substance.

11. The process of claim 10, wherein the hydrous oxide of the metal is prepared by adding a hydroxide to an aqueous solution containing a salt of the metals until a pH of from 3 to 8.5 is attained and the hydrous oxide of the metal or metals is formed.

12. The process of claim 11, wherein the said hydroxide used is ammonium hydroxide or sodium hydroxide.

13. The process of claim 11 wherein the pH is brought to a value of from 6 to 8.

14. The process of claim 10, wherein the chelate is formed by co-precipitating in situ the hydrous metal oxide in an aqueous medium containing the nitrogen-containing organic substance and an appropriate metal salt by addition of a hydroxide to the aqueous medium.

15. The process of claim 14, wherein the hydroxide added is ammonium hydroxide or sodium hydroxide.

16. The process of claim 10 wherein the chelation is carried out at ambient temperature with a pH of the reaction medium in which the chelate is formed of from 4 to 8.

17. Process according to claim 10, wherein the hydrous oxide used is derived frrom $Zr^{IV}$, $Sn^{II}$, $Fe^{III}$, $V^{III}$, $Ti^{IV}$ or $Ti^{III}$.

18. Process according to claim 10, wherein the hydrous oxide used is derived from tetravalent zirconium.

19. The process of claim 10 wherein the nitrogen-containing organic substance is an enzyme selected from the group consisting of glucose, oxidase, glucose isomerase, lactase, catalase, invertase, $\alpha$- or $\beta$-amylase, pullulanase, penicillin acylase, bacterial protease, trypsin, chymotrypsin, glucoamylase, dextranase and glucosidase.

20. The process of claim 10 wherein the nitrogen-containing organic substance is a lectin.

21. The process of claim 10 wherein the nitrogen-containing organic substance is an antibody.

22. The process of claim 10 wherein the nitrogen-containing organic substance is a co-enzyme selected from the group consisting of nicotinamide adenine dinucleotide and reduced nicotinamide adenine dinucleotide.

23. The process of claim 10 wherein the nitrogen-containing organic substance is an antibiotic selected from the group consisting of penicillin, gramicidin D, lathumycin, neomycin, polymyxin, streptomycin, ampicillin and chloroamphenicol.

24. The process of claim 10 wherein the nitrogen-containing organic substance consists of whole cells selected from the group consisting of cells of bakers' yeast and *Escherichia coli*.

25. The process of claim 10 wherein the chelate is treated with an aqueous bicarbonate or carbonate solution or with an acid at low concentration and acidity to separate the nitrogen-containing organic substance.

26. The process of claim 19 wherein the separated chelate is treated with an aqueous bicarbonate or carbonate solution or with an acid at low concentration and acidity to separate the antibiotic.

* * * * *